Patented Sept. 17, 1929

1,728,391

UNITED STATES PATENT OFFICE

PETER C. CHRISTENSEN, OF EAST ORANGE, NEW JERSEY

COATING AND FILLING MATERIALS AND THE PRODUCTION THEREOF

No Drawing.   Application filed October 22, 1926.   Serial No. 143,509.

My invention relates to coating and filling materials and more particularly to a new and improved material of this nature which is similar in some of its characteristics to cold water paints, and which, while particularly well adapted for use in certain forms as a coating material in many places where kalsomines, stains, paints, lacquers, enamels and varnishes are now employed, is also adapted for various other uses such as a sizing for paper and other materials, and a filler and stiffener for leather and felts, etc. My invention also relates to the method of producing this improved material.

Generally stated, my invention resides in a material, such as described, which is of superior quality and economical to produce.

One of the objects of my invention is to provide a surfacing material which is preferably quick-drying and which when applied to a surface will result in a rich, glossy, durable and preferably hard coating.

Another object of my invention is to provide various other forms of my improved material adapted for use as effective and economical sizings, and fillers, and stiffeners for papers, leathers, felts and other materials.

Other objects and features of my invention will be hereinafter more fully described.

My invention is mainly based on the fact that certain leather constituents, and notably the protein constituents of leather, are soluble in quite a number of alkaline solutions and the discovery that when such constituents are dissolved in such an alkaline solution, a composition having the above indicated desirable characteristics for a coating, sizing, filling and stiffening material may be obtained.

In producing my improved material I preferably proceed as follows:

Leather, and preferably a mass of scrap leather because of its cheapness, is first subjected, preferably at ordinary room temperature, to the action of a dilute solution of any of a number of acids for the purpose of removing therefrom the oils, fats, glucose, glycerine and similar substances. A solution of either sulphuric, nitrate or hydrochloric acid may be used to advantage, but I find that best results are obtained, especially where the ultimate product is to be used as an oil paint, varnish, enamel or lacquer, by subjecting the leather to the action of a solution of hydrochloric acid. While good results are obtainable by using anywhere from a fraction of one per cent up to a ten per cent acid solution, I find in general that the weaker the acid solution, the better the results obtained, and I preferably employ from a one-half per cent to a two per cent solution of hydrochloric acid. The leather is subjected to this treatment for a period of from about six to twenty-four hours, this largely depending on the strength of the acid solution employed and the thickness of the leather pieces being treated. The leather is then removed from the acid solution and boiled in water in an open vessel for a period varying from about one-half hour to three hours, during which the leather, then consisting almost entirely of fibrous protein materials, is disintegrated and comminuted, and settles in the form of a heavy brown gum. This gum, which forms the base of my improved coating and filling material and which may suitably be termed "leather gum," is then removed from the water and dissolved in an alkaline solution, the latter preferably being heated slightly, for example, to a temperature of from 100° F. to 150° F. to accelerate the dissolving of the gum therein. The alkaline solution used may be of almost any strength, but it is preferable to use a fairly weak solution. Also any of a number of different alkaline solutions, such as a solution of ammonium hydroxide, crystalline, borax, sodium hydroxide, potassium hydroxide or lithium hydroxide, may be employed with good results, the particular alkaline solution used being generally determined by its cost.

The amount of leather gum which is dissolved in a given amount of the alkaline solution depends to a great extent on the use to which the resulting material is to be applied. For example, when such material is to be used merely as a stain or a cold water paint, the amount of leather gum dissolved in a given amount of the alkaline solution is usually much less than when the material is to be used as an oil paint, a lacquer, an enamel, or a varnish, each of which generally has considerable body. I also find that if the leather used in producing the leather gum which comprises the base of my improved material is treated with a solution of hydrochloric acid, such material when applied to a surface will result in a richer and more glossy coating than where this leather is treated with a solution of another acid. Accordingly, where the ultimate material is to be used in place of an oil paint, an enamel, a varnish, or a lacquer, the leather used in producing the leather gum is preferably treated with a solution of hydrochloric acid, but where the material is to be used as a stain or cold water paint, satisfactory results may be obtained by treating said leather with a solution of another acid, such as sulphuric or nitric acid. Also where the material is to be used as a filler, size or stiffener, it is generally satisfactory to treat the leather with a solution of either nitric or sulphuric acid.

Where it is desirable to produce a hard, durable surface coating, I preferably add to the alkaline solution of leather constituents or leather gum, produced as described above, a small amount of an aldehyde hardening solution, and preferably an amount thereof just below that which would effect the coagulation of the alkaline leather solution. I find that about the best results are obtained by adding to the alkaline leather solution approximately two per cent by weight of a forty per cent solution of formaldehyde. The resulting product comprises a very effective surfacing material for producing a hard and durable coating on an object to which it is applied. Fairly good results, where a hard, durable surface coating is desired, may also be obtained by applying an alkaline leather solution, produced as described above, but without the aldehyde hardening material added thereto, to the object to be coated, permitting the coating to dry, then immersing the coated object for a short time in an aldehyde hardening solution, preferably in anywhere from a ten per cent to a forty per cent solution of formaldehyde, and finally removing the object from the hardening solution and permitting the coating thereon to dry.

It is to be understood that the preferred forms of my improved material, as well as the methods of producing the same, specifically described herein, are subject to various changes and modifications without departure from the spirit of my invention and the scope of the appended claims.

Having now described my invention, what I claim as new and desire to protect by Letters Patent is as follows:

1. A material of the character described, comprising an alkaline solution having only the protein constituents of leather dissolved therein and containing a hardening agent.

2. A material of the character described, comprising an alkaline solution having only the protein constituents of leather dissolved therein and containing an aldehyde.

3. A material of the character described, comprising an alkaline solution having only the protein constituents of leather dissolved therein and containing formaldehyde.

4. A material of the character described, comprising an alkaline solution having "leather gum" dissolved therein and containing not more than about two per cent by weight of a forty per cent solution of formaldehyde.

5. A material of the character described, comprising an alkaline solution having "leather gum" dissolved therein and containing a hardening agent.

6. The method which consists in removing oils, fats, and similar substances from leather, then boiling the leather in water until the same is disintegrated and settles in the form of a gum, and dissolving said gum in a solution of alkali.

7. The method which consists in removing oils, fats and similar substances from leather, then boiling the leather in water until the same is disintegrated and settles in the form of a gum, dissolving said gum in a solution of alkali, and adding a hardening agent to the resulting alkaline leather solution.

8. The method which consists in removing oils, fats and similar substances from leather, then boiling the leather in water until the same is disintegrated and settles in the form of a gum, dissolving said gum in a solution of alkali, and adding an aldehyde to the resulting alkaline leather solution.

9. The method which consists in removing oils, fats and similar substances from leather, then boiling the leather in water until the same is disintegrated and settles in the form of a gum, dissolving said gum in a solution of an alkali, and adding to the resulting alkaline leather solution not more than about two per cent by weight of a forty per cent solution of formaldehyde.

10. The method which consists in subjecting leather to the action of a weak solution of hydrochloric acid to remove oils, fats and similar substances therefrom, then boiling the leather in water until the same settles in the form of a gum, then dissolving said gum in a solution of alkali.

11. A material of the character described, comprising an alkaline solution having only the protein constituents of leather dissolved therein.

12. A material of the character described, comprising an alkaline solution having dissolved therein only those leather constituents which remain after removing from leather substantially all oils, fats, glucose, glycerine and similar substances.

This specification signed this 19th day of October, 1926.

PETER C. CHRISTENSEN.